(12) United States Patent
Lee (10) Patent No.: US 7,832,749 B2
(45) Date of Patent: Nov. 16, 2010

(54) SPINDLE BRACKET OF TORSION BEAM AXLE SUSPENSION

(75) Inventor: Won Jae Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/497,232

(22) Filed: Jul. 2, 2009

(65) Prior Publication Data

US 2010/0019466 A1 Jan. 28, 2010

(30) Foreign Application Priority Data

Jul. 25, 2008 (KR) ...................... 10-2008-0073236

(51) Int. Cl.
*B60G 9/02* (2006.01)
(52) U.S. Cl. ............................................. 280/124.116
(58) Field of Classification Search .......... 280/124.106, 280/124.116, 124.128, 124.13, 124.132, 280/124.153, 124.166; 29/897.2
See application file for complete search history.

(56) References Cited

U.S. PATENT DOCUMENTS

| | | | |
|---|---|---|---|
| 5,406,254 A | * | 4/1995 | Le Nay et al. .............. 340/501 |
| 6,152,468 A | * | 11/2000 | Glaser et al. ........... 280/124.134 |
| 6,935,646 B2 | * | 8/2005 | Inoue et al. ........... 280/124.106 |
| 7,520,516 B2 | * | 4/2009 | Murata ................ 280/124.128 |
| 2008/0150249 A1 | * | 6/2008 | Murata ................ 280/124.128 |

FOREIGN PATENT DOCUMENTS

| | | |
|---|---|---|
| JP | 2004-42690 A | 2/2004 |
| KR | 10-2006-0014143 A | 2/2006 |

* cited by examiner

*Primary Examiner*—Paul N Dickson
*Assistant Examiner*—Robert A Coker
(74) *Attorney, Agent, or Firm*—Morgan, Lewis & Bockius LLP (57) ABSTRACT

A spindle bracket of a torsion beam axle suspension system is defined on an end portion of a trailing arm to be connected to a hub assembly on which a wheel and a tire are mounted. The spindle bracket may include a first inner bracket that is welded to an inner side and an outer side of an end portion of a upper member of the trailing arm, a second inner bracket that is welded to an inner side and an outer side of an end portion of a lower member of the trailing arm, and an outer bracket that is attached to the first and second inner brackets to be engaged with the hub assembly in company with the first and second inner brackets.

8 Claims, 8 Drawing Sheets

SPINDLE BRACKET OF TORSION BEAM AXLE SUSPENSION

CROSS-REFERENCE TO RELATED APPLICATION

The present application claims priority to Korean Patent Application Number 10-2008-0073236 filed on Jul. 25, 2008, the entire contents of which application incorporated herein for all purposes by this reference.

BACKGROUND OF THE INVENTION

1. Field of the Invention

The present invention relates to a torsion beam axle suspension system. More particularly, the present invention relates to a spindle bracket of torsion beam axle suspension system having a structure in which a welding length of a trailing arm is increased.

2. Description of Related Art

Generally, even though the suspension system of a torsion beam axle type has simple components and narrow performance in a design, it has high driving stability compared to the low production cost and the light mass such that it can be mainly applied to a smaller car and a semi-mid-size car.

Figure 6:
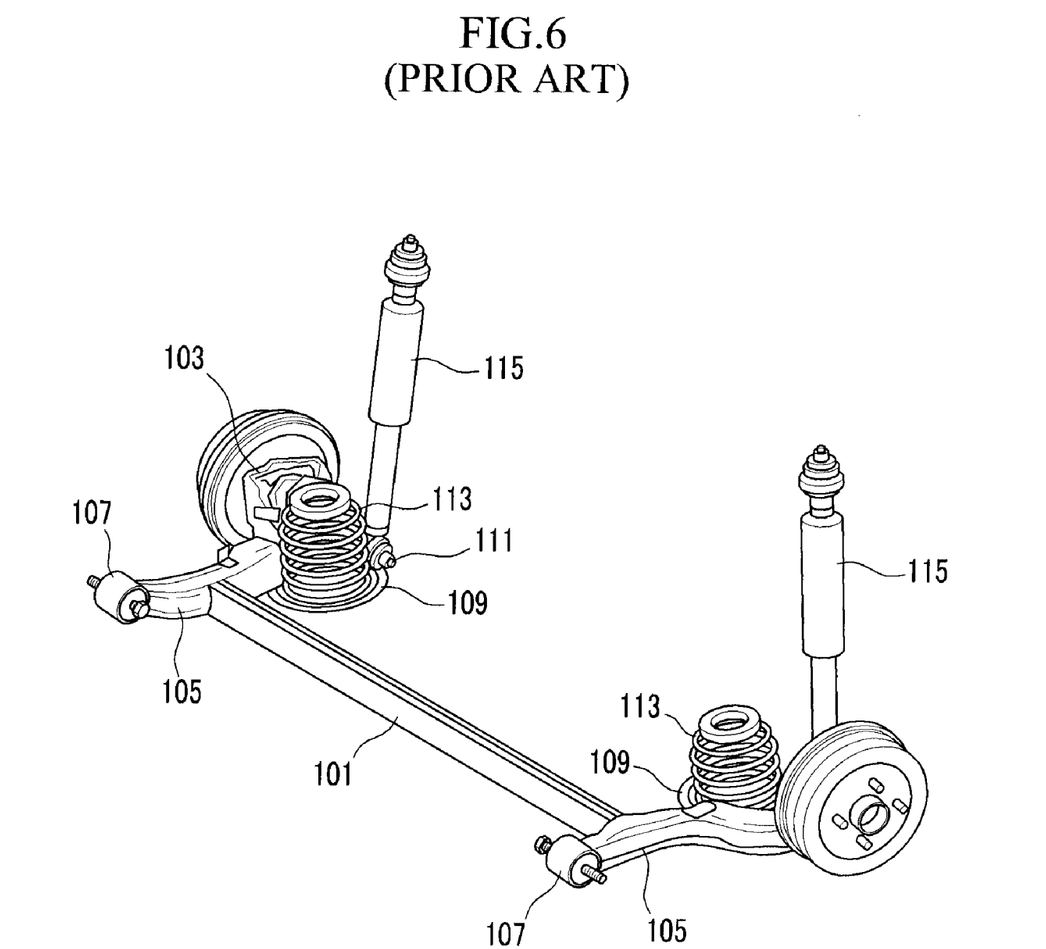
FIG. 6 is a perspective view showing conventional suspension system of a torsion beam axle type.

In the suspension system of the torsion beam axle type, as shown in FIG. 6, a torsion beam 101 is disposed in the horizontal direction of a vehicle body, and a trailing arm 105 that is fitted with a spindle bracket 103 is respectively welded at both sides of the torsion beam 101.

Further, a mounting bushing 107 is configured at the front end of the trailing arm 105 to be connected to the vehicle body, and a spring seat 109 on which a spring 113 is mounted and a shock absorber pin 111 to which a shock absorber 115 is connected are mounted at the center and the rear of the trailing arm 105.

The wheel moves according to the torsion deformation of the torsion beam 101 in the middle of the suspension system of the torsion beam axle type according to the conventional art, and the wheel is induced to toe-in by the deformation of the torsion beam 101, the position of the trailing arm 105, and the characteristic of the mounting bushing 107.

Here, the spindle bracket 103 is configured on the end portion of the trailing arm 105 to be connected to the hub assembly (not shown) on which a wheel and a tire are mounted.

Figure 7:
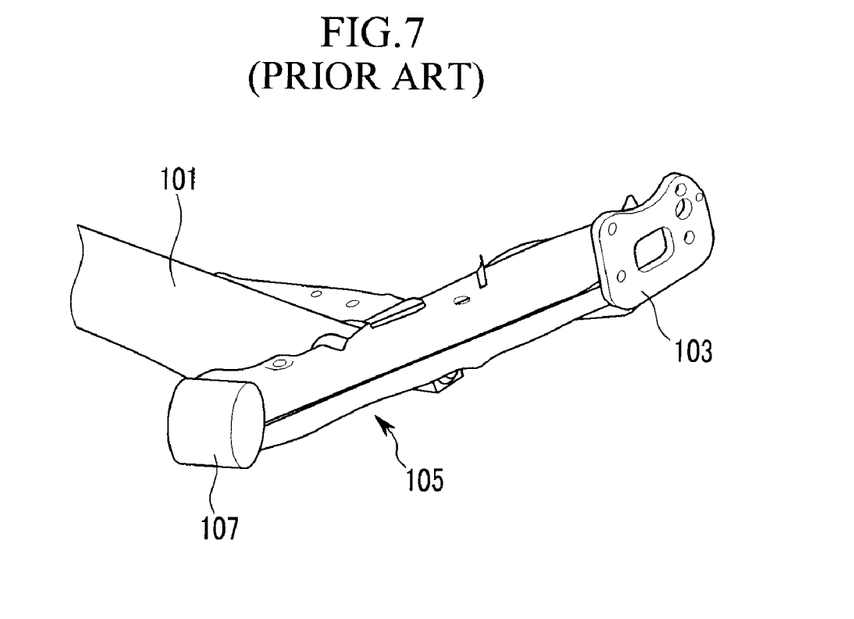
FIG. 7 and FIG. 8 are perspective views showing a conventional spindle bracket part that is applied to a suspension system.

The spindle bracket 103, as shown in FIG. 7, has a plate shape having a thickness of about 10 mm to be welded to the end portion of the trailing arm 105, and it is attached to a hub assembly (not shown) through a fixing means such as a bolt.

Figure 8:
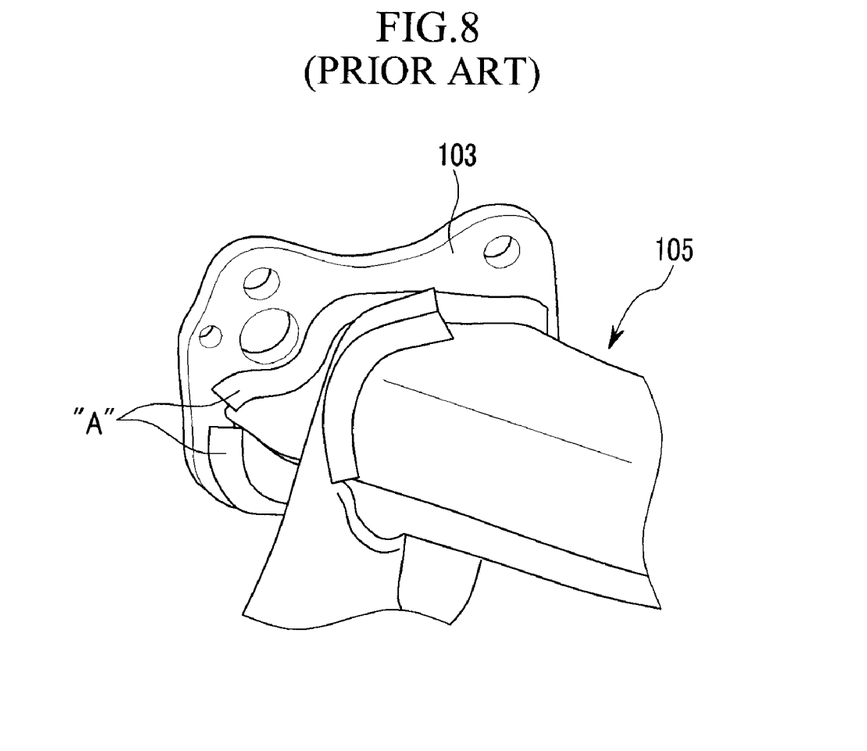

However, in the spindle bracket 103 of a torsion beam axle type suspension system according to the conventional art, as shown in FIG. 8, a welding portion ("A") is formed along the end portion circumference at the outer surface of the trailing arm 105, such that sufficient welding length in the trailing arm 105 cannot be achieved and durability of the welding portion is deteriorated.

So as to prevent the above problem, the stiffness of the spindle bracket 103 is enhanced by increasing the size thereof in the conventional art, such that the weight of the entire suspension system is increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a spindle bracket of a torsion beam axle suspension system having advantages of increasing the welding length of the trailing arm so as to improve the durability thereof.

In an aspect of the present invention, the spindle bracket of a torsion beam axle suspension system that is defined on an end portion of a trailing arm to be connected to a hub assembly on which a wheel and a tire are mounted, may include a first inner bracket that is welded to an inner side and an outer side of an end portion of a upper member of the trailing arm, a second inner bracket that is welded to an inner side and an outer side of an end portion of a lower member of the trailing arm, and an outer bracket that is attached to the first and second inner brackets to be engaged with the hub assembly in company with the first and second inner brackets.

The upper member and the lower member of the trailing arm may be monolithically formed.

A plurality of bolt engagement holes may be formed in the first and second inner brackets and the outer bracket.

The first and second inner brackets and the outer bracket may be welded to each other.

A first groove may be formed in the first inner bracket corresponding to the end portion of the upper member of the trailing arm, and a second groove is formed in the second bracket corresponding to the end portion of the lower member of the trailing arm, wherein a penetration hole is formed in the outer bracket corresponding to the first and second grooves that are formed in the first and second inner brackets respectively, wherein the outer bracket and the first and second inner brackets are welded to each other along inner edges of the first and second grooves and the penetration hole, and wherein the outer bracket and the first and second inner brackets are welded to each other along outer edges of the first and second brackets and the outer bracket.

In another aspect of the present invention, the outer bracket and the first and second inner brackets are welded to each other along outer edges of the first and second brackets and the outer bracket.

As stated above, in the spindle bracket of the torsion beam axle suspension system according to various aspects of the present invention that is configured as stated above, the first and second inner brackets are respectively fixed to the upper and lower portions of the end portion of the trailing arm, the inner side and the outer side of the trailing arm are welded, and the hub assembly is fixed to the outer bracket and the inner brackets by bolts such that the welding length to the trailing arm is increased to improve the durability of the entire spindle bracket.

Also, through the welding structure of the first and second inner brackets in various aspects of the present exemplary embodiment, the size of the entire spindle bracket is not increased to reinforce the durability thereof such that the weight of the entire suspension system is prevented from being increased, different from the conventional art.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
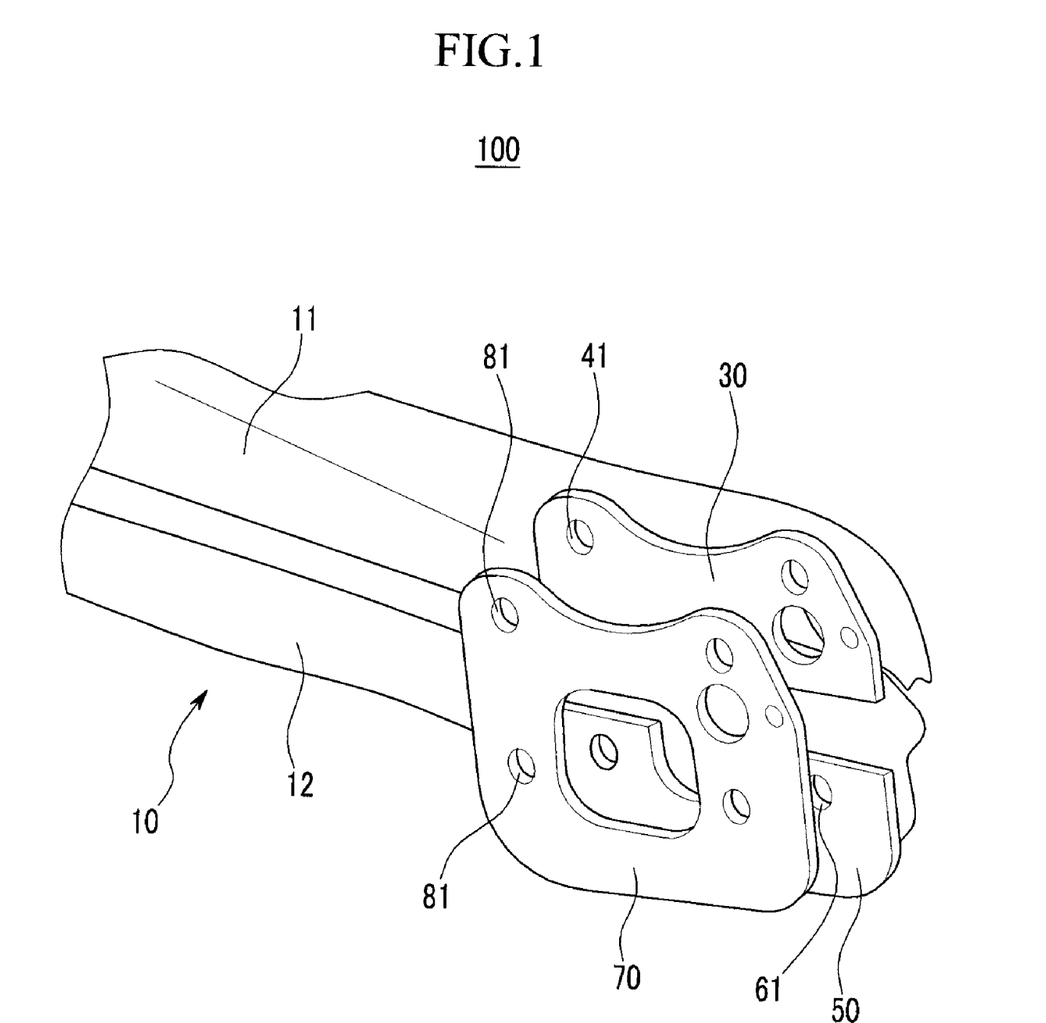
FIG. 1 is an exploded perspective view showing an exemplary spindle bracket of a torsion beam axle suspension system according to the present invention.
Figure 2:
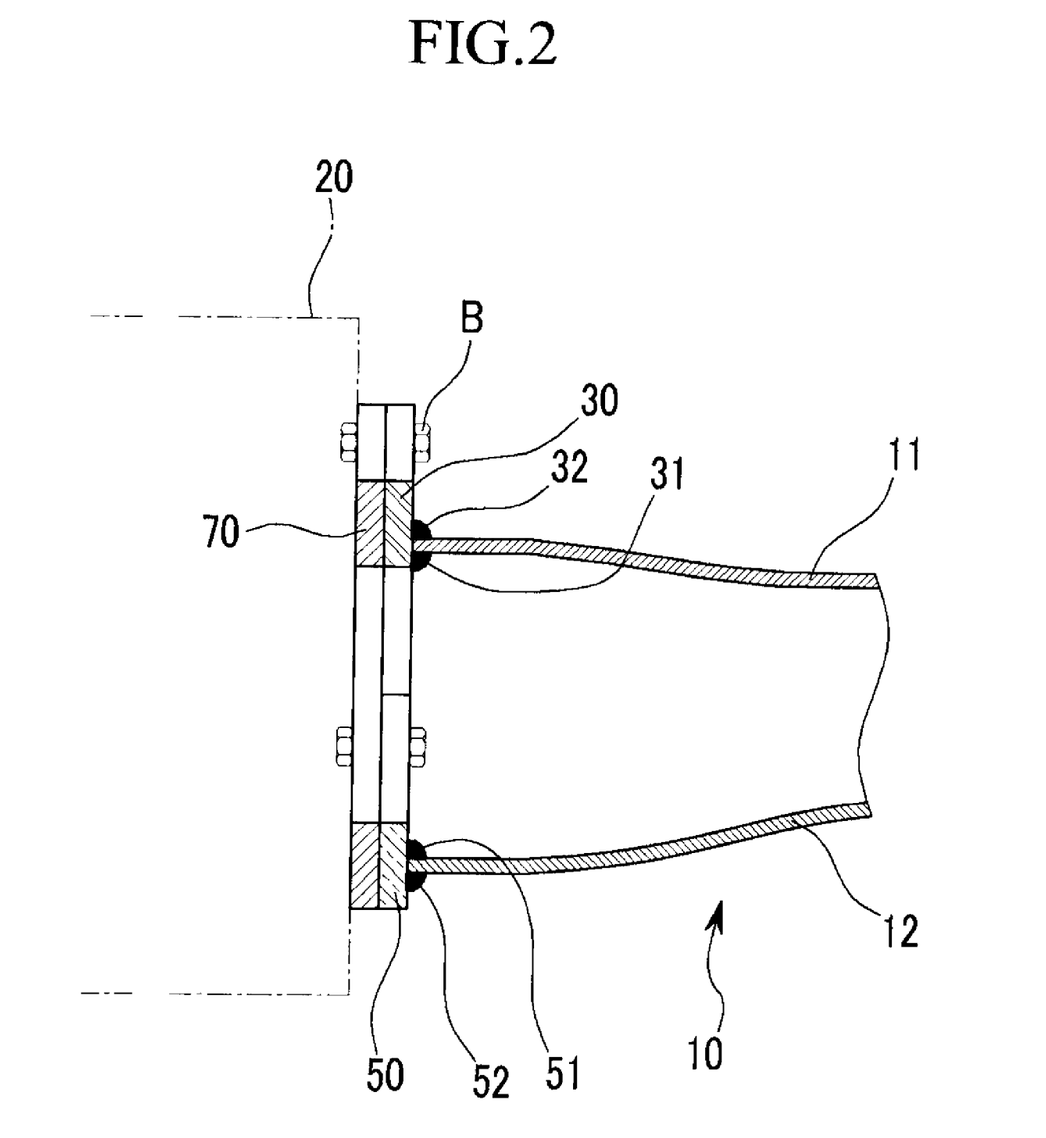
FIG. 2 is a sectional view showing the assembled condition of FIG. 1.

FIG. 1 is an exploded perspective view showing a spindle bracket of a torsion beam axle suspension system according to various embodiments of the present invention, and FIG. 2 is a sectional view showing the assembled condition of FIG. 1.

Referring to the drawings, a spindle bracket 100 of a suspension system of a torsion beam axle type according to various embodiments of the present invention is configured on the end portion of a trailing arm 10 that is welded to the end portion of a torsion beam to be engaged with a hub assembly to which a wheel and a tire are attached.

Here, the trailing arm 10 includes an upper member 11 and a lower member 12, and the upper member 11 and the lower member 12 are welded to each other.

In the suspension system of the torsion beam axle type, the other constituent elements are described in the conventional art, so detailed descriptions thereof will be omitted.

The spindle bracket 100 of the torsion beam axle type suspension system according to various embodiments of the present invention has a structure that increases the welding length in the end portion of the trailing arm 10 such that the durability of the welded portion can be maximized.

For this, the spindle bracket 100 of the torsion beam axle type suspension system basically includes a first inner bracket 30, a second inner bracket 50, and an outer bracket 70, and detailed descriptions thereof are as follows.

In various embodiments, the first inner bracket 30 is welded to the upper part of the end portion of the trailing arm 10, that is, the end portion of the upper member 11.

Figure 3A:
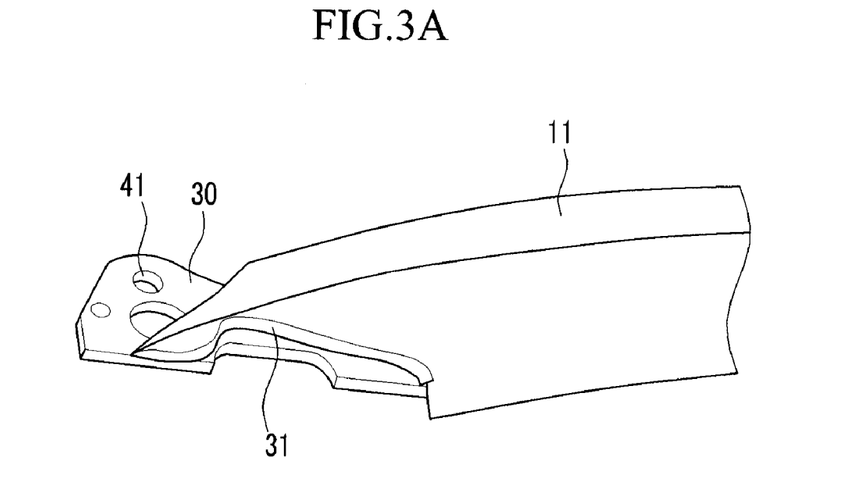
FIG. 3A to FIG. 3C are perspective views showing an exemplary welding portion of a first inner bracket of a spindle bracket of a torsion beam axle suspension system according to the present invention.
Figure 3B:
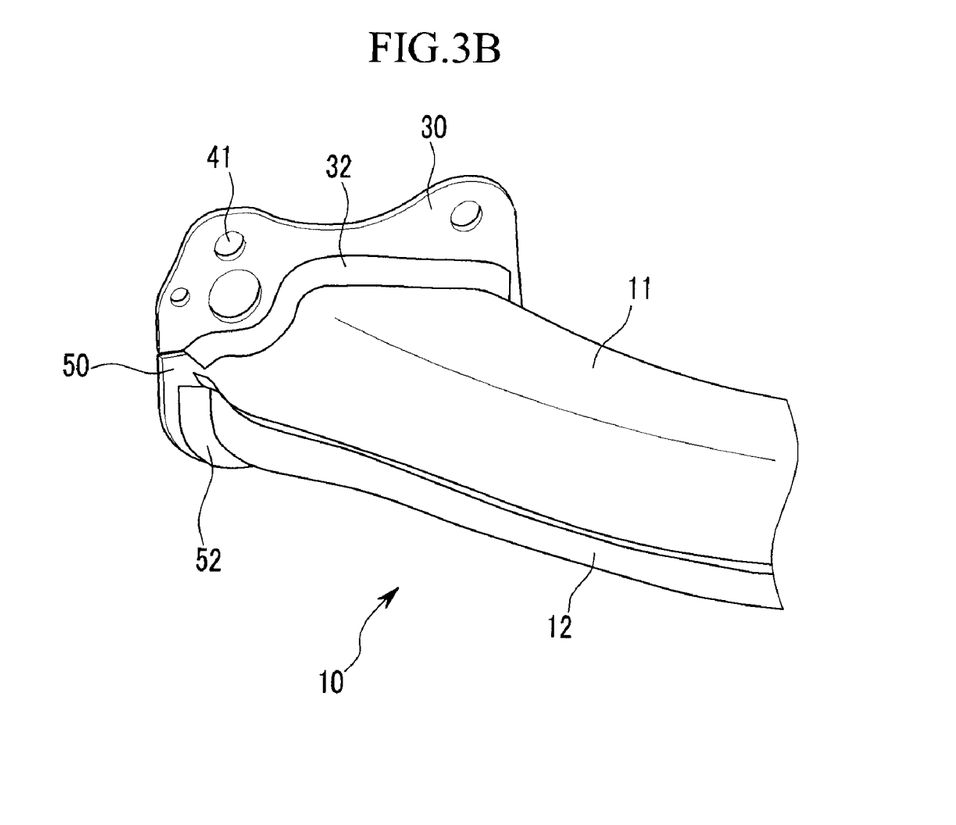

In this case, as shown in FIG. 3A and FIG. 3B, the inner side and the outer side of the upper member 11 are welded so as to fix the first inner bracket 30 to the upper member 11.

That is, the inner side of the upper member 11 is connected to the first inner bracket 30 through a first welding portion 31, referring to FIG. 3A, and the outer side of the upper member 11 is connected to the first inner bracket 30 through a second welding portion 32, referring to FIG. 3B.

In various embodiments, the second inner bracket 50 is welded to the lower part of the end portion of the trailing arm 10, that is, the end portion of the lower member 12.

Figure 3C:
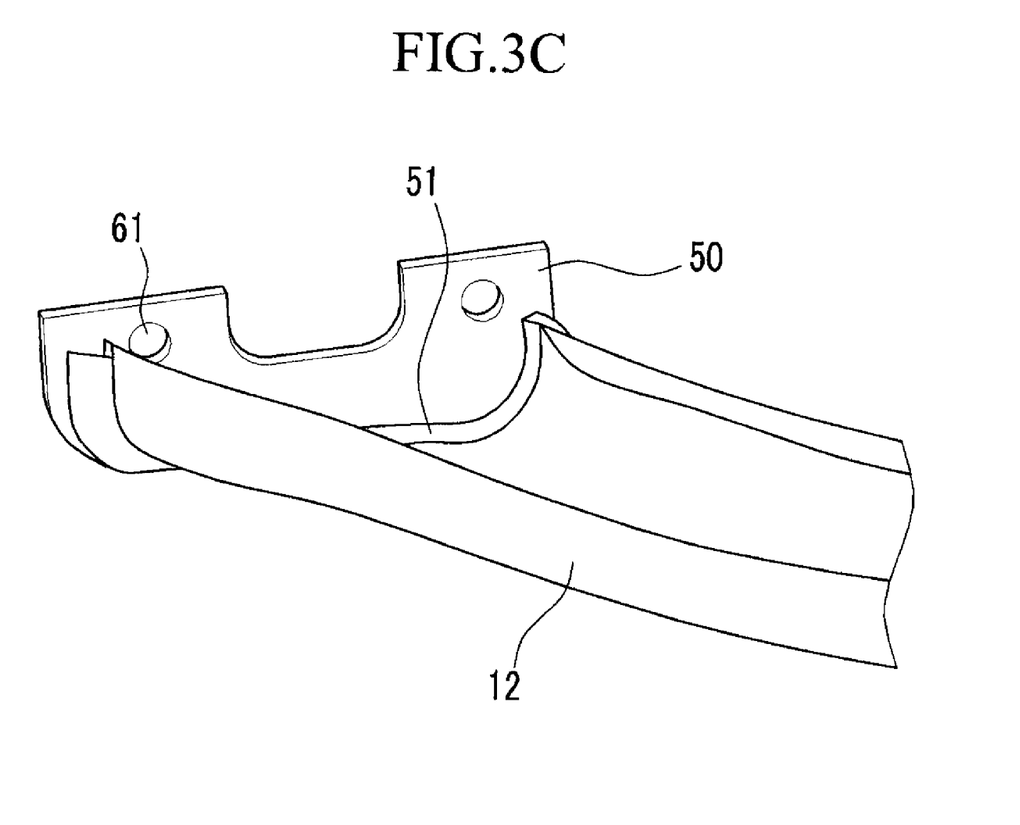

In this case, as shown FIG. 3B and FIG. 3C, the inner side and the outer side of the lower member 12 are welded so as to fix the second inner bracket 50 to the lower member 12.

That is, the second inner bracket 50 and the inner side of the lower member 12 are connected by a third welding portion 51, referring to FIG. 3C, and the second inner bracket 50 and the outer side of the lower member 12 are connected by a fourth welding portion 52, referring to FIG. 3B.

Here, referring to FIG. 1 and FIG. 2, in the first and second inner brackets 30 and 50 as stated above, first bolt engagement holes 41 and 61 are formed for bolts B to be inserted therein.

Further, if the thickness of the spindle bracket is 10 t (mm) according to the conventional art, it is desirable that the first and second inner brackets 30 and 50 respectively have a thickness of 5 t (mm) in various embodiments.

In various embodiments, the outer bracket 70 has a single body structure coinciding with the first and second inner brackets 30 and 50 that are integrally formed.

The outer bracket 70 closely contacts the first and second inner brackets 30 and 50 to be fixed to the hub assembly 20 with the first and second inner brackets 30 and 50 by the bolts B.

For this, second bolt engagement holes 81 are formed in the outer bracket 70 corresponding to the first bolt engagement holes 41 and 61 of the first and second inner brackets 30 and 50.

Here, if the thickness of the spindle bracket is 10 t according to the conventional art, it is desirable that the thickness of the outer bracket 70 is 5 t in various embodiments.

Accordingly, in the spindle bracket of the torsion beam axle suspension system according to various embodiments of the present invention that is configured as stated above, the first and second inner brackets 30 and 50 are respectively fixed to the upper and lower portions of the end portion of the trailing arm 10, the inner side and the outer side of the trailing arm 10 are welded, and the hub assembly 20 is fixed to the outer bracket 70 and the inner brackets 30 and 50 by the bolts such that the welding length to the trailing arm 10 is increased to improve the durability of the entire spindle bracket 100.

Also, through the welding structure of the first and second inner brackets 30 and 50 in various embodiments, the size of the entire spindle bracket 100 is not increased to reinforce the durability thereof such that the weight of the entire suspension system is prevented from being increased, different from the conventional art.

In other embodiments of the present invention, the outer bracket 70 and the first and second inner brackets 30 and 50 are welded to each other along outer edges thereof.

Figure 4:
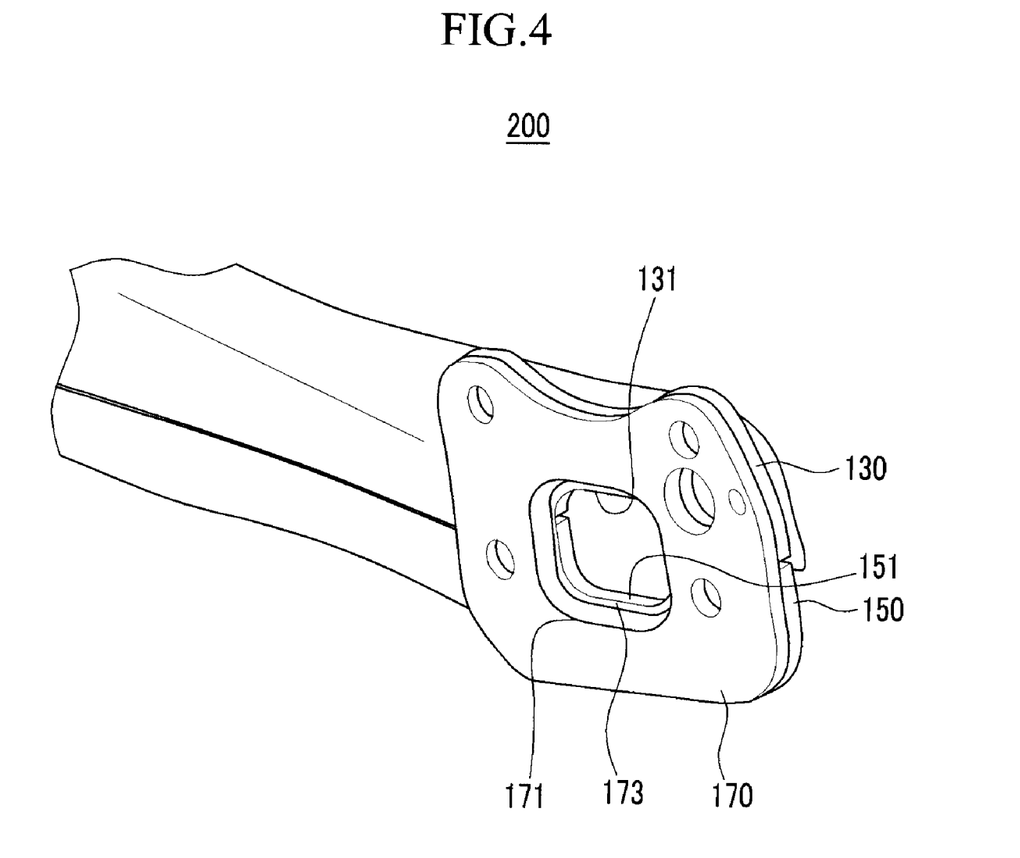
FIG. 4 is a perspective view of an exemplary spindle bracket of torsion beam axle type suspension system according to the present invention.
Figure 5:
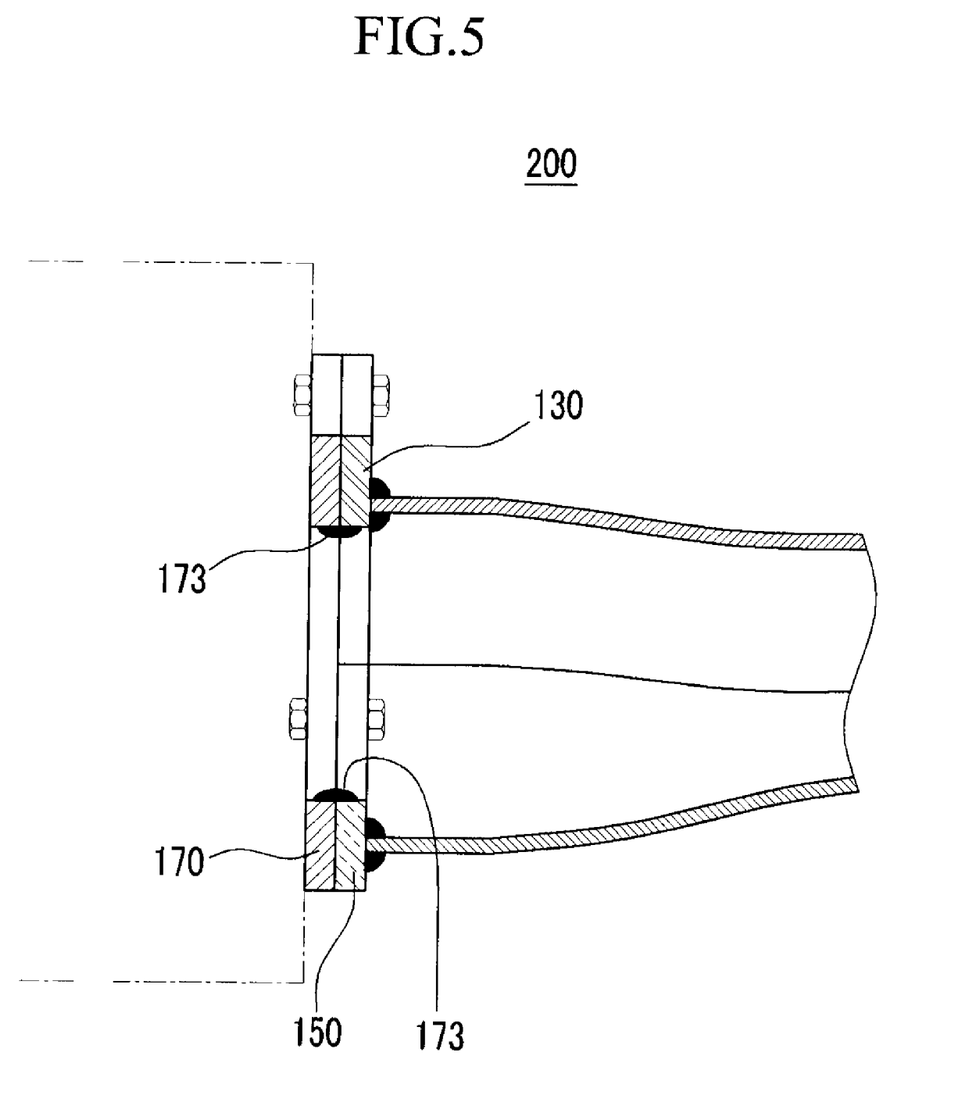
FIG. 5 is a sectional view of FIG. 4.

FIG. 4 is a perspective view of a spindle bracket of a torsion beam axle suspension system according to other embodiments of the present invention, and FIG. 5 is a sectional view of FIG. 4.

Referring to the figures, the spindle bracket of the torsion beam axle suspension system 200 according to various embodiments has the basic structure as described in the above described embodiments, and first and second inner brackets 130 and 150 and an outer bracket 170 are welded to each other.

Here, grooves 131 and 151 are respectively formed on the facing end portions of the first and second inner brackets 130 and 150 in the upper/lower direction, and a penetration hole 171 is formed through the outer bracket 170 to communicate with the grooves 131 and 151 of the first and second inner brackets 130 and 150.

In this case, the edge portions of the grooves 131 and 151 of the first and second inner brackets 130 and 150 and the edge portion of the penetration hole 171 of the outer bracket 170 are welded to each other in various embodiments.

That is, a fifth welding portion 173 is formed between the edge portions of the grooves 131 and 151 of the first and second inner brackets 130 and 150 and the edge portion of the penetration hole 171 of the outer bracket 170 in various embodiments.

In other embodiments of the present invention, the outer bracket 170 and the first and second inner brackets 130 and 150 are welded to each other along outer edges thereof.

Accordingly, the first and second inner brackets 130 and 150 and the outer bracket 170 are welded to each other in various embodiments such that the stiffness of the entire spindle bracket 200 is reinforced.

The other structures and operations of the spindle bracket of the torsion beam axle type suspension system 200 according to various embodiments of the present invention as stated above are the same as those of the above-described embodiments, and the detailed descriptions thereof will be omitted in this specification.

For convenience in explanation and accurate definition in the appended claims, the terms "upper", "lower", "rear", "outer", and "inner" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A spindle bracket of a torsion beam axle suspension system that is defined on an end portion of a trailing arm to be connected to a hub assembly on which a wheel and a tire are mounted, comprising:

a first inner bracket that is welded to an inner side and an outer side of an end portion of an upper member of the trailing arm;

a second inner bracket that is welded to an inner side and an outer side of an end portion of a lower member of the trailing arm; and an outer bracket that is attached to the first and second inner brackets to be engaged with the hub assembly in company with the first and second inner brackets;

wherein a plurality of bolt engagement holes are formed in the first and second inner brackets and the outer bracket.

2. The spindle bracket of claim 1, wherein the upper member and the lower member of the trailing arm are monolithically formed.

3. The spindle bracket of claim 1, wherein the first and second inner brackets and the outer bracket are welded to each other.

4. The spindle bracket of claim 1, wherein the outer bracket and the first and second inner brackets are welded to each other along outer edges of the first and second brackets and the outer bracket.

5. A spindle bracket of a torsion beam axle suspension system that is defined on an end portion of a trailing arm to be connected to a hub assembly on which a wheel and a tire are mounted, comprising:

a first inner bracket that is welded to an inner side and an outer side of an end portion of an upper member of the trailing arm;

a second inner bracket that is welded to an inner side and an outer side of an end portion of a lower member of the trailing arm; and an outer bracket that is attached to the first and second inner brackets to be engaged with the hub assembly in company with the first and second inner brackets;

wherein a first groove is formed in the first inner bracket corresponding to the end portion of the upper member of the trailing arm, and a second groove is formed in the second inner bracket corresponding to the end portion of the lower member of the trailing arm.

6. The spindle bracket of claim 5, wherein a penetration hole is formed in the outer bracket corresponding to the first and second grooves that are formed in the first and second inner brackets respectively.

7. The spindle bracket of claim 6, wherein the outer bracket and the first and second inner brackets are welded to each other along inner edges of the first and second grooves and the penetration hole.

8. The spindle bracket of claim 6, wherein the outer bracket and the first and second inner brackets are welded to each other along outer edges of the first and second brackets and the outer bracket.

* * * * *